Oct. 18, 1955     F. C. MATHIEU     2,721,031
MECHANICAL INDICATOR FOR SPECTROGRAPHS
Filed May 24, 1951     2 Sheets-Sheet 1

Inventor:
Frederic Cesar Mathieu
By: Michael S. Striker
agt.

Oct. 18, 1955

F. C. MATHIEU 2,721,031

MECHANICAL INDICATOR FOR SPECTROGRAPHS

Filed May 24, 1951

Inventor:
Frederic Cesar Mathieu

By: Michael S. Struker
agt.

United States Patent Office 2,721,031
Patented Oct. 18, 1955

2,721,031
MECHANICAL INDICATOR FOR SPECTROGRAPHS

Frédéric César Mathieu, Paris, France, assignor to Compagnie Radio Cinéma, a corporation of France Application May 24, 1951, Serial No. 228,103

Claims priority, application France May 25, 1950

5 Claims. (Cl. 235—61)

It is known that, in apparatus intended for the analysis of visible or invisible luminous radiations, prisms are used which are generally disposed at the minimum of deviation, and are made, for example, of quartz crystal or of glass. A convenient optical system sends a flat light beam on a face of the prism, and from the other face the decomposed light is emitted, the lines corresponding to the various wave lengths and being projected upon an appropriate screen which can be marked with a reference scale. It can be pointed out that, on that scale, the distances between the various lines, starting from an arbitrary origin, are not proportional to the wave lengths.

For example, Figure 1, as indicated hereinbelow, represents a spectrum of eight lines, numbered from 1 to 8, and arranged in a line along a reference straight line $X'X$, the wavelengths increasing from $X$ towards $X'$. The distance of the various lines from the first one will be called $d$, the first one corresponding for example to a wavelength, $\lambda$, of 3000 Angstroms, while the line 4 corresponds to 3500 Angstroms, and is separated from 1 by a distance $d_1$. Assuming that the line 8 is separated from 1 by $d_2 = 2d_1$, it can be verified that the wavelength of 8 is greater than:

$$3000 + 2(3500 - 3000) = 4000 \text{ Angstroms}$$

Finally, the variation of the wavelengths $\lambda$ with $d$ is not linear. It has been stated that this variation approximately follows an hyperbolic law, expressed by a formula called Hartmann's formula which may be written $$\lambda = \lambda_0 - \frac{C}{d_0 + d}$$

an expression in which $\lambda_0$, $C$ and $d_0$ are constants.

The readings on a nonproportional scale being difficult for an operator, mechanical combinations have been sought, which would permit to transform the variations expressed by the Hartmann's formula in linear variations. Such devices should allow reading of the wavelengths on a dial or on a scale whose graduations are proportional to these wavelengths, an index or any marking element whatever being simply displaced and brought successively in coincidence with the spectrum lines which it is desired to analyse.

Figure 2, as indicated below, schematically represents an arrangement providing for that result. That figure, in POR, shows a member in the form of V having a constant opening angle $\alpha$, which can turn in its plane around its top point C. Its branches OP and OR respectively drive with them two movable points M and N whose coordinates can be defined with respect to two rectangular axes $Ouv$ and $Ow$. By means of convenient connections, the point M remains on the branch OP and on a horizontal line having the fixed ordinate $a$. Similarly, the point N remains on the branch OR and on a horizontal line having the fixed $b$. The value of the angle $\alpha$ is arbitrary.

If the member POR rotates around O, for example in the direction of the arrow F, its position can be marked in relation with the abscissa $u$ of M, the abscissa $v$ of N thus being also another function of $u$.

Starting from the following evident relations:

$v = b$ tg $\beta$ and $u = a$ tg $(\alpha+\beta)$, and choosing tg $\alpha = A =$ constant, a suite of easy transformations will give:

$$v = \frac{b}{A} - \frac{ab(1+A^2)}{A(a+Au)}$$

therefore, the variation of $v$ as a function of $u$ is a hyperbola.

Supposing now that it may be possible to make $u$ proportional to the displacements of $d$ along a spectrum, and $v$ proportional to the indications of a linear scale marked in wavelengths, the Hartmann's formula will be found again with a certain factor of proportionality.

Some devices based on the principle of the Figure 2 have already been proposed.

However, the Hartmann's formula is not rigorous. As it contains three arbitrary constants, these constants may be chosen so that the formula is exact for three points of the scale, for example the two extremities and a third point near the middle. By so doing and translating the corrections applied to the formula into rectangular coordinates, a curve such as that of Figure 3, as indicated below, is found, on which the wavelengths $\lambda$ have been chosen as the abscissas and the corrections $\Delta\lambda$ as the ordinates. The known devices did not allow the taking into account of these corrections. Accordingly, they had to be neglected or they required supplementary calculations.

The object of the present invention is to eliminate the above-described drawbacks and to allow the direct reading of the wavelengths on a proportional scale, the correction being taken into account.

According to a first characteristic of the invention, a V-shaped rocking piece, the angle of which is fixed, can turn in its plane around its apex, the first branch of the V being mechanically joined to a first body moving in a first rectilinear direction, proportionally to the distances separating the various lines of a spectrum, the second branch being joined to a second body moving in a second rectilinear direction, parallel to the first one, means of connection being provided between the second moving body and an element indicator of wavelengths, the first branch being near the position perpendicular to the two directions when the first moving body is at the beginning of its course, and the connections being such that the trajectory of the first moving body with respect to the first branch is sinusoidal, while the trajectory of the second moving body with respect to the second branch, is rectilinear.

According to another characteristic of the invention, the junctions between the two moving bodies and the branches of the V are realized by contact, preferably with interposition of ball bearings, the contact being secured by elastic means.

According to a further characteristic of the invention, the proportionality between the distances separating the various lines of the spectrum and the displacements of the first moving body is secured by a reducing device including two screws of different pitches.

The invention will be better understood with the help of the following description, with reference to the enclosed drawings, in which:

Fig. 1 represents a spectrum of eight lines obtained from a conventional optical system;

Fig. 2 diagrammatically represents an arrangement wherein the spectrum lines obtained on a scale are proportional to their wave lengths;

Figure 6:
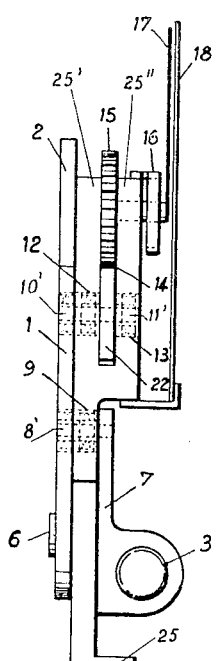
Figure 1:
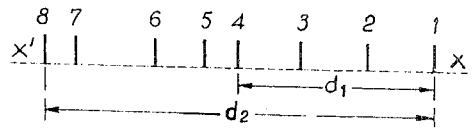
Figure 4:
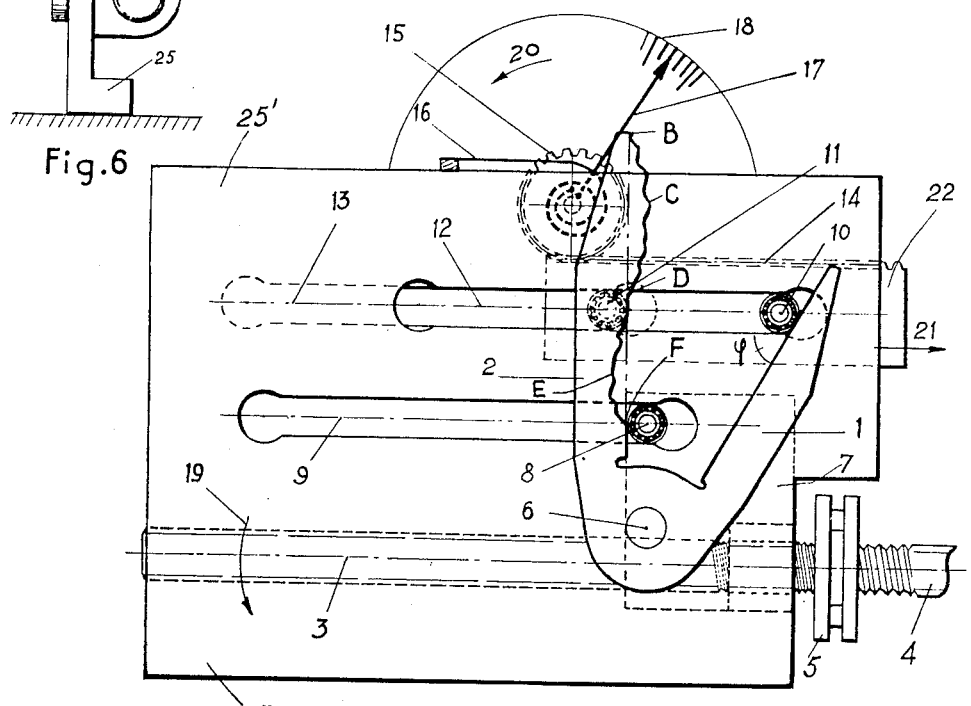
Fig. 4 is an elevational view of an embodiment of the present invention wherein the two moving bodies are at the beginning of their course.
Figure 7:
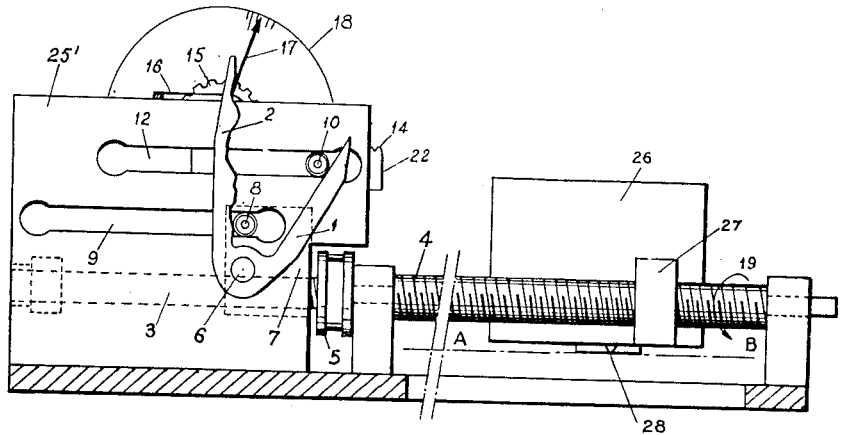

Fig. 6 is a side view of the apparatus shown in Fig. 4 when viewed in a direction opposite to the arrow 21 of Fig. 4, the screws 3 and 4 being omitted for purposes of clarity; and Fig. 7 is a side view of the apparatus shown in Fig. 4 with a smaller scale showing at the right hand portion thereof the position of a spectrum analyzer apparatus.

In the figures, the same reference numbers indicate the same elements.

Referring at first to Figure 4, a V-shaped piece may be seen, whose branches are 1 and 2, and which may turn in the plane of the drawing around an axis 6, perpendicular to this plane. Two rectilinear screws are seen in 3 and 4 coupled by a connecting member 5. The pitch of the screw 4 is larger than that of the screw 3. A threaded bush 7 is engaged with 3; another threaded bush, not shown in Fig. 4, is fastened to an analyser device of a spectrum of lines, also not shown in this figure, that device for example including a photoelectric cell provided with an exploring slot.

The bush 7 is provided with a ball bearing 8 which may move in a rectilinear groove 9. A slide block 22 is at its turn, provided with two ball-bearings 10 and 11, which respectively move in the grooves 12 and 13; that slide block 22 is milled to form a rack gear 14 which meshes with a pinion 15, on which an indicating needle 17 is fixed so as to move around a graduated dial 18. Of course, the grooves 9, 12 and 13, as well as the rack 14, are parallel to the screws 3 and 4, besides, the axes of the ball-bearings 8, 10 and 11, as well as the axis of the cog-wheel 15, are perpendicular to the plane of the drawing.

A spiral spring 16 urges the pinion 15 back in the direction of the arrow 20; then, the slide block 22 is driven back in the direction of the arrow 21, which permanently applies the ball-bearing 10 against the branch 1; then the member 1—2 tends to turn clockwise around the axis 6, which applies the branch 2 against the ball-bearing 8. It will be noticed that, in this manner, every connection is maintained without any looseness.

In the starting position which is seen in figure 4, the outline of the right hand face of the branch 2, in contact with the ball-bearing 8, is shown by a continuous line B, C, D, E, F, and the average line BF of that outline represented by an interrupted line, is perpendicular to the common direction of the screws 3 and 4. The spectrum exploring device is arranged, at one end of that spectrum as shown in Fig. 7.

Figure 2:
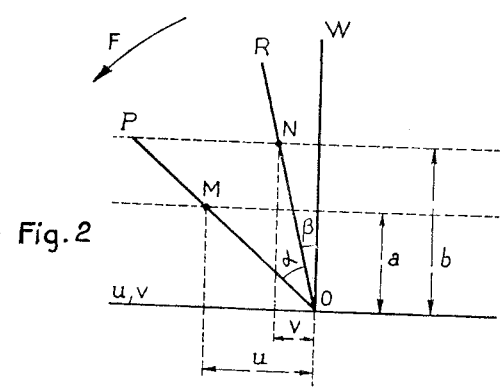

When the screws 3 and 4 are made to turn in the direction of the arrow 19, the bush 7 is driven leftwards and forces the member 1—2 to turn, the ball-bearing 8 bearing upon the branch 2; in its turn, the branch 1 pushes the ball bearing 10 and the slide block 22, and finally, the needle 17 goes over the dial 18 in direction reverse of the arrow 20, the effect of that motion being to stretch the spiral spring 16. When the spectrum exploring device of the spectrum has arrived at the end of its course, the various elements of the mechanism are in the position represented in Figure 5. The point of contact of the ball bearing 8 on the branch 2 is then at the extremity B and the indicating needle 17 has gone over all the graduations of the dial 18. In accordance with the theory mentioned when studying the Figure 2, these graduations indicate the variations of wavelength according to a proportional scale easy to be read.

Figure 5:
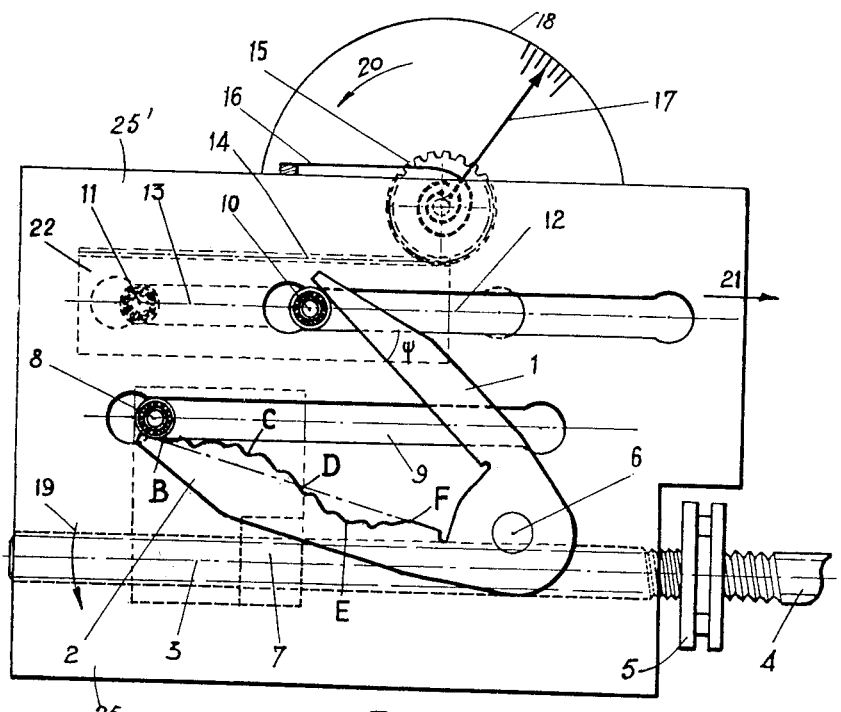
Fig. 5 is an elevational view of the embodiment shown in Fig. 4 wherein the two moving bodies are at the end of their course.
Figure 3:
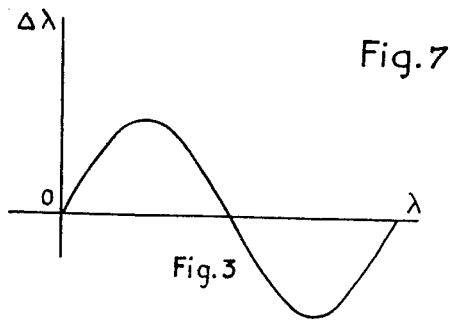
Fig. 3 is a graphical representation of Hartmann's formula when the three arbitrary constants therein are advantageously chosen.

It will be noticed that, the average line BF being perpendicular to the screws 3 and 4 at the start, the contact point between the ball bearing 8 and the branch 2 goes over this branch always in the same direction, passing from the Figure 4 position to the Figure 5 position. Then, the face of contact of the branch 2 may be provided with a sinusoidal profile such as BCDEF, this profile providing for correction of Hartmann's law, as above explained according to Figure 3; moreover, this profile may simultaneously take into account the imperfections of manufacture of some pieces, namely of the possible faults in cutting the thread of the screws 3 and 4. Finally, on the dial 18, a proportional scale can be obtained, which accurately indicates the wavelengths of the various lines of the spectrum to be analysed.

It is evident that, the corrections to be applied to Hartmann's law or made necessary by the mechanism imperfections being very small, the sinuousity actually is to a very small degree. Therefore it has been much exaggerated on the figures to provide a clearer understanding of the device.

Of course, if the screws 3 and 4 are made to turn in a direction opposite to the arrow 19, the various elements would come back from the Figure 5 position to the Figure 4 position, the unit constituted by the rocking member 1—2, the slide block 22, the pinion 15 and the needle 17 being pulled back by effect of the elasticity of the spring 16.

It will be noticed that, in order to obtain the correction by means of the sinusoidal profile BCDEF, the only condition to fulfill consists in the fact that, as above said, the contact point of the ball bearing 8 on the branch 2 always be moved in the same direction so as to cover the whole graduation of the dial 18. Then it is evident that the perpendicular position of the average line BF, such as represented on the Figure 4, is not rigorously indispensable. The piece 1—2 could start from a position slightly inclined towards the left, with respect to the position shown in that figure. However, it is reasonable to keep into account the mechanical connection between the branch 1 and the ball bearing 10, and to avoid any danger of jamming, the angle $\varphi$ of Figure 4 and the angle $\psi$ of Figure 5 should be made as similar to each other as possible. It is easy to see that, in these conditions, the starting position of the line BF should preferably be, if not perpendicular to the axis of the screws 3 and 4, at least very close to that perpendicular.

Referring now to Fig. 6, a support 25 has two grooves 9 and 12 in its front portion and a groove 13 in its rear portion. Shaft 8' which carries ball bearing member 8 is fixed on nut 7 threadedly mounted upon screw 3 for movement therealong. Shafts 10' and 11', also shown in Fig. 6, are fixed on slide block 22 and rotatably carry ball bearing members 10 and 11, slide block 22 being guided laterally by parts 25' and 25" of support 25. Threaded nut 7 carries a tapped portion 3' in which screw 3 is threadedly engaged.

As shown in Fig. 7, which illustrates a more complete front view of applicant's device, there is provided an analyzing device 26 for analyzing the spectrum of light indicated by the interrupted line A—B. The analyzing device 26 carries a nut 27 threadedly engaging screw 4 and also has an exploring slit 28. Screws 3 and 4 are connected by coupling member 5 in a manner to form a single assembly. When this assembly is rotated in the sense of the arrow 19, as shown in Fig. 7, nut 27 is displaced toward the left along screw 4, and exploring slit 28 moves along spectrum A—B, while nut 7 moves toward the left along screw 3. The displacement of nut 7 in turn effects the displacement toward the left of ball bearing member 8; the displacement of ball bearing member 8 in turn produces rotation of arm 2, and as a consequence also produces rotation of arm 1. Rotation of arm 1 causes a displacement toward the left of ball bearing member 10 and of slide block 22. As a result, gear 15 rotates and pointer 17 moves over the front of dial 18. It is evident that each position of exploring slit 28 on spectrum A—B corresponds to a position of pointer 17 on dial 18. Dial 18 is graduated linearly in wave lengths, and by virtue of the construction of the device in accordance with the present invention, pointer 17 indicates exactly the wave length of the spectral ray in front of which slit 28 is located.

It is evident that the described device could be subjected to alterations of detail without going beyond the scope of the invention. Particularly, the driving gear with reduction obtained by means of the two screws 3 and 4 whose pitches are different could be replaced by any other mechanical combination providing the same result. The circular dial 18 could also be replaced by a rectilinear graduated scale, a movable-index being conveniently connected to slide block 22.

What I claim is:

1. A device of the character described comprising, in combination, a support; a guiding member pivoted to said support turnably about an axis and having two guiding portions the projections of which on a projection plane normal to said axis form part of the legs of a V having its apex located substantially in said axis; an operating member mounted on said support movably in rectilinear direction in a plane normal to said axis and permanently engaging during said movement one of said guiding portions of said guiding member so as to move during its rectilinear movement along said guiding portion and turn said guiding member about its apex, said one guiding portion of said guiding member being curved along a wave line; an indicating member mounted on said support movably in a rectilinear direction parallel to the movement of said operating member and permanently engaging during said movement the other of said guiding portions of said guiding member so as to be moved during turning of said guiding member about its apex along the other of said guiding portions and in its rectilinear direction of movement, said other guiding portion of said guiding member being rectilinear; and means for moving said operating member whereby when said means are moving said operating member in accordance with a scale following substantially a hyperbolic law, said indicating member is moved in accordance with a linear law, and said wave line of said one guiding portion compensates the deviations of said scale from the hyperbolic law.

2. A device of the character described comprising, in combination, a plane support; a guiding member having two guiding portions forming part of the legs of a V having its apex located within said guiding member, said guiding member being pivoted to said support turnably about said apex in a plane parallel to said support; an operating member mounted on said support movably in rectilinear direction and permanently engaging during said movement one of said guiding portions of said guiding member so as to move during its rectilinear movement along said guiding portion and turn said guiding member about its apex, said one guiding portion of said guiding member being curved along a wave line shaped as a sinuous curve superposed on a sinusoidal curve; an indicating member mounted on said support movably in a rectilinear direction parallel to the movement of said operating member and permanently engaging during said movement the other of said guiding portions of said guiding member so as to be moved during turning of said guiding member about its apex along the other of said guiding portions and in its rectilinear direction of movement, said other guiding portion of said guiding member being rectilinear; and means for moving said operating member whereby when said means are moving said operating member in accordance with a scale following substantially a hyperbolic law, said indicating member is moved in accordance with a linear law, and said wave line of said one guiding portion compensates the deviations of said scale from the hyperbolic law and corrects the geometrical faults of the device.

3. A device of the character described comprising, in combination, a plane support; a guiding member having two guiding portions forming part of the legs of a V having its apex located within said guiding member, said guiding member being pivoted to said support turnably about said apex in a plane parallel to said support; an operating member mounted on said support movably in rectilinear direction and permanently engaging during said movement one of said guiding portions of said guiding member so as to move during its rectilinear movement along said guiding portion and turn said guiding member about its apex; an indicating member mounted on said support movably in a rectilinear direction parallel to the movement of said operating member and permanently engaging during said movement the other of said guiding portions of said guiding member so as to be moved during turning of said guiding member about its apex along the other of said guiding portions and in its rectilinear direction of movement; means for moving said operating member whereby when said means are moving said operating member in accordance with a scale following substantially a hyperbolic law, said indicating member is moved in accordance with a linear law; a member rigidly connected to said operating member and having an internally threaded part having a first pitch; a first screw threaded rod arranged parallel to the linear direction in which said operating member is moving, said first screw threaded rod having the first pitch so as to engage said internally threaded part of said member; and a second screw threaded rod arranged in alignment with said first screw threaded rod and being rigidly connected thereto, said second screw threaded rod carrying a nut rigidly connected to an analyzing device displaced along a spectrum consisting of spectral lines, said second screw threaded rod having a larger pitch than said first pitch of said internally threaded part and said first screw threaded rod.

4. A device of the character described comprising, in combination, a support; an indicating member and an operating member mounted on said support and movable thereon along two parallel directions respectively; means for moving said operating member; and a guiding member having two guiding portions forming part of the legs of a "V" having its apex located within said guiding member, said guiding member being mounted on said support for angular displacement thereon about an axis passing through said apex and perpendicular to said parallel directions, one of said guiding portions being displaceable between two extreme positions situated on opposite sides of a plane containing said axis and perpendicular to said parallel directions, the other guiding portion being displaceable between two extreme positions one of which is situated substantially at said plane and the other on one side of said plane, said one guiding portion being in permanent engagement with said indicating member, and said other guiding portion being in permanent engagement with said operating member and being curved along a sinuous profile so shaped that when said operating member is moved in accordance with a scale following substantially a hyperbolic law, said sinuous profile compensates the deviations of said scale from the hyperbolic law and corrects the geometrical faults of the device.

5. A device of the character described, comprising, in combination, a support; an indicating member and an operating member mounted on said support movable thereon along two parallel directions respectively; a guiding member having two guiding portions forming the legs of a "V" having its apex located within said guiding member, said guiding member being mounted on said support for angular displacement thereon about an axis passing through said apex and perpendicular to said parallel directions, one of said guiding portions being displaceable between two extreme positions on opposite sies of a plane containing said axis and perpendicular to said parallel directions, the other guiding portion being displaceable between two extreme positions one of which is situated substantially at said plane and the other on one side of said plane, said one guiding portion being in permanent engagement with said indicating member, and said other guiding portion being in permanent engagement with said operating member and being curved along a sinuous profile so shaped that when said operating member is moved in accordance with a scale following substantially a hyperbolic law, said sinuous profile compensates the deviations of said scale from the hyperbolic law and corrects the geometrical faults of the device; first means for moving said operating member; and second means constantly urging said indicating member so as to tend to turn said other guiding portion toward said plane.

References Cited in the file of this patent

UNITED STATES PATENTS

| | | |
|---|---|---|
| 2,402,027 | Crowther | June 11, 1946 |
| 2,481,648 | Dehn | Sept. 13, 1949 |

FOREIGN PATENTS

| | | |
|---|---|---|
| 54,132 | France | Dec. 11, 1944 |

OTHER REFERENCES

Computing Mechanism and Linkages by Svoboda; 359 page volume; McGraw-Hill, 1948, Radiation Lab. Series. Pertinent figures on pages 78, 94 and 194.